US010015339B2

(12) United States Patent
Satomi (10) Patent No.: US 10,015,339 B2
(45) Date of Patent: Jul. 3, 2018

(54) IMAGE READING APPARATUS, IMAGE READING METHOD, AND RECORDING MEDIUM THEREFOR, THAT IMPROVE QUALITY OF IMAGE OF DOCUMENT OBTAINED BY PORTABLE IMAGE DEVICE

(71) Applicant: Kyocera Document Solutions Inc., Osaka (JP)

(72) Inventor: Seiki Satomi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/488,487

(22) Filed: Apr. 16, 2017

(65) Prior Publication Data

US 2017/0302812 A1  Oct. 19, 2017

(30) Foreign Application Priority Data

Apr. 15, 2016 (JP) ................................ 2016-082518

(51) Int. Cl.
 *H04N 1/04* (2006.01)
 *H04N 1/00* (2006.01)
 (Continued)

(52) U.S. Cl.
 CPC ..... *H04N 1/00798* (2013.01); *H04N 1/00307* (2013.01); *H04N 1/107* (2013.01);
 (Continued)

(58) Field of Classification Search
 CPC ......... G06F 17/30244; G06F 17/30247; G06F 17/30011; G06F 17/30256;
 (Continued)

(56) References Cited

U.S. PATENT DOCUMENTS 6,215,914 B1 *  4/2001  Nakamura ........... H04N 1/3876
                                                   348/584
7,333,963 B2 *  2/2008  Widrow ............ G06F 17/30247
                                                   382/155
(Continued)

FOREIGN PATENT DOCUMENTS

JP        2010-204941 A        9/2010

*Primary Examiner* — Negussie Worku
(74) *Attorney, Agent, or Firm* — James Judge (57) ABSTRACT

An image reading apparatus includes an imaging unit, an image data analysis unit, and an image combination unit. The imaging unit images the document image multiple times from mutually differing angles to generate a plurality of data images each representing the document image. The image data analysis unit performs matching on the plurality of data images by matching the plurality of data images, on a per-region basis in each of the plurality of images of the document represented by the plurality of data images, so as to obtain per-region brightnesses for the plurality of data images, and comparing the obtained brightnesses among the plurality of data images to select from among the plurality of data images each data image whose region is comparatively brighter. The image compositing unit uses the data images selected on the per-region basis as comparatively bright to generate a composite data image.

8 Claims, 6 Drawing Sheets

(51) Int. Cl.
*H04N 1/195* (2006.01)
*H04N 1/107* (2006.01)

(52) U.S. Cl.
CPC . *H04N 1/19594* (2013.01); *H04N 2201/0081* (2013.01); *H04N 2201/0096* (2013.01)

(58) Field of Classification Search
CPC .......... G06F 17/30259; H04N 1/00307; H04N 1/2133; H04N 1/32101; H04N 2101/00; H04N 2201/3225; H04N 2201/3274; H04N 2201/3278; H04N 5/232
USPC ..... 358/1.15, 1.13, 1.16, 1.18, 1.3; 382/155, 382/159, 103, 162, 165, 181, 190, 199, 382/218, 224, 225, 276, 305, 312
See application file for complete search history.

(56) References Cited

U.S. PATENT DOCUMENTS

| | | | |
|---|---|---|---|
| 8,368,918 B2* | 2/2013 | Deng | G06F 17/30256 358/1.15 |
| 8,755,837 B2* | 6/2014 | Rhoads | G06F 17/30244 382/162 |
| 2004/0081332 A1* | 4/2004 | Tuttle | G06K 9/00442 382/100 |
| 2005/0013486 A1* | 1/2005 | Wiedemann | G06K 9/0063 382/181 |
| 2005/0117816 A1* | 6/2005 | Saeger | G02B 21/365 382/305 |
| 2008/0068622 A1* | 3/2008 | Deng | G06F 17/30256 358/1.3 |
| 2008/0267464 A1* | 10/2008 | Goda | H04N 1/00474 382/124 |
| 2013/0003083 A1* | 1/2013 | Satomi | H04N 1/3935 358/1.2 |
| 2016/0100755 A1* | 4/2016 | Chen | G06T 5/002 382/131 |
| 2016/0307059 A1* | 10/2016 | Chaudhury | G06K 9/00463 |
| 2016/0358355 A1* | 12/2016 | Lin | G06K 9/4638 |
| 2017/0192727 A1* | 7/2017 | Yun | G06F 3/1296 |
| 2018/0005405 A1* | 1/2018 | Furihata | G06T 7/70 |
| 2018/0080829 A1* | 3/2018 | Tanimura | G01J 3/52 |

* cited by examiner

IMAGE READING APPARATUS, IMAGE READING METHOD, AND RECORDING MEDIUM THEREFOR, THAT IMPROVE QUALITY OF IMAGE OF DOCUMENT OBTAINED BY PORTABLE IMAGE DEVICE

INCORPORATION BY REFERENCE

This application is based upon, and claims the benefit of priority from, corresponding Japanese Patent Application No. 2016-082518 filed in the Japan Patent Office on Apr. 15, 2016, the entire contents of which are incorporated herein by reference.

BACKGROUND

Unless otherwise indicated herein, the description in this section is not prior art to the claims in this application and is not admitted to be prior art by inclusion in this section.

An image of a document is generally read by using a scanner. A typical scanner is configured to obtain a high-resolution image without a shadow by evenly irradiating the document with a stable light source and causing a line scanner to scan. On the other hand, by a spread of smart phones having a capturing function, it has been desired to read the image of the document using the smart phone.

SUMMARY

An image reading apparatus according to one aspect of the disclosure reads a document image represented on a document. The image reading apparatus includes an imaging unit, an image data analysis unit, and an image combination unit. The imaging unit images the document image multiple times from mutually differing angles to generate a plurality of data images each representing the document image. The image data analysis unit performs matching on the plurality of data images by matching the plurality of data images, on a per-region basis in each of the plurality of images of the document represented by the plurality of data images, so as to obtain per-region brightnesses for the plurality of data images, and comparing the obtained brightnesses among the plurality of data images to select from among the plurality of data images each data image whose region is comparatively brighter. The image compositing unit uses the data images selected on the per-region basis as comparatively bright to generate a composite data image.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as an "embodiment") with reference to the drawings.

Figure 1:
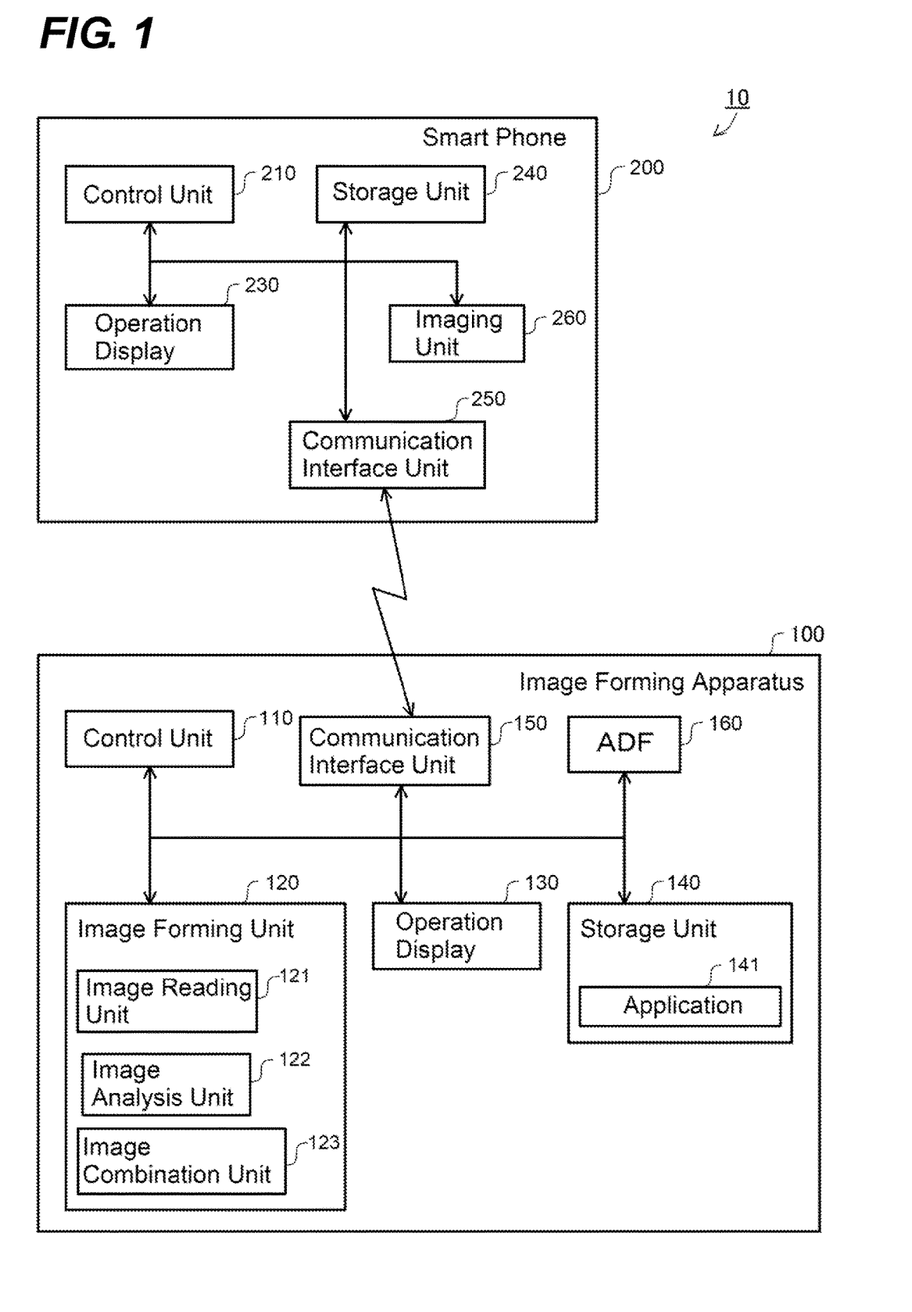
FIG. 1 illustrates a block diagram illustrating a functional configuration of an image reading system according to one embodiment of the disclosure.

FIG. 1 illustrates a block diagram illustrating a functional configuration of an image reading system 10 according to one embodiment of the disclosure. The image reading system 10 includes an image forming apparatus 100 and a smart phone 200. The image forming apparatus 100 includes a control unit 110, an image forming unit 120, an operation display 130, a storage unit 140, a communication interface unit 150, and an automatic document feeder (ADF) 160. The image forming unit 120 includes an image reading unit 121, which generates image data by reading an image from a document, an image analysis unit 122, and an image combination unit 123. Functions of the image analysis unit 122 and the image combination unit 123 will be described later.

The smart phone 200 includes a control unit 210, an operation display 230, a storage unit 240, a communication interface unit 250, and an imaging unit 260. The smart phone 200 is connected to the image forming apparatus 100 with a short range wireless communication using the communication interface unit 250 and the communication interface unit 150. This embodiment uses Bluetooth® CLASS 1 for the short range wireless communication. Bluetooth® CLASS 1 is communications at an output of 100 mW and is short range wireless communications by which communications at a distance between the image forming apparatus 100 and the smart phone 200 of about within 100 m are possible.

The operation display 130 of the image forming apparatus 100 and the operation display 230 of the smart phone 200 serve as touch panels, display various menus as an entry screen, and accept operation inputs by a customer.

The control units 110 and 210 and the image forming unit 120 include a main storage unit, such as a RAM and a ROM, and a control unit, such as a micro-processing unit (MPU) and a central processing unit (CPU). The control unit 110 includes a controller function that pertains to an interface, such as various kinds of I/O, a universal serial bus (USB), a bus, and other hardware. The control units 110 and 210 respectively control image forming apparatus 100 and smart phone 200 overall.

The storage units 140 and 240 are storage devices constituted of a hard disk drive, a flash memory, or a similar medium, which are non-transitory recording media, and store control programs and data for processes executed by the control units 110 and 210, respectively. The storage unit 140 stores a document image obtaining application program 141 (also simply referred to as an application) in order to be installed in the smart phone 200.

In this example, the smart phone 200 has already downloaded the document image obtaining application program 141 from the storage unit 140 of the image forming apparatus 100 and installed in the storage unit 240.

Figure 2A:
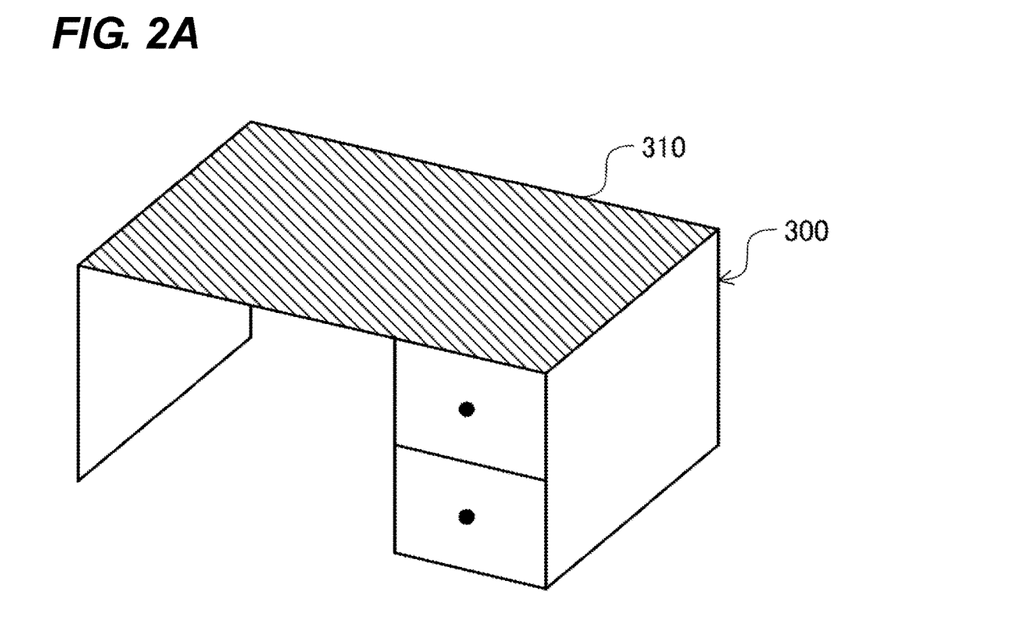
FIGS. 2A to 2B illustrate an environment where a document as an image reading object for the image reading system according to the one embodiment is placed.
Figure 2B:
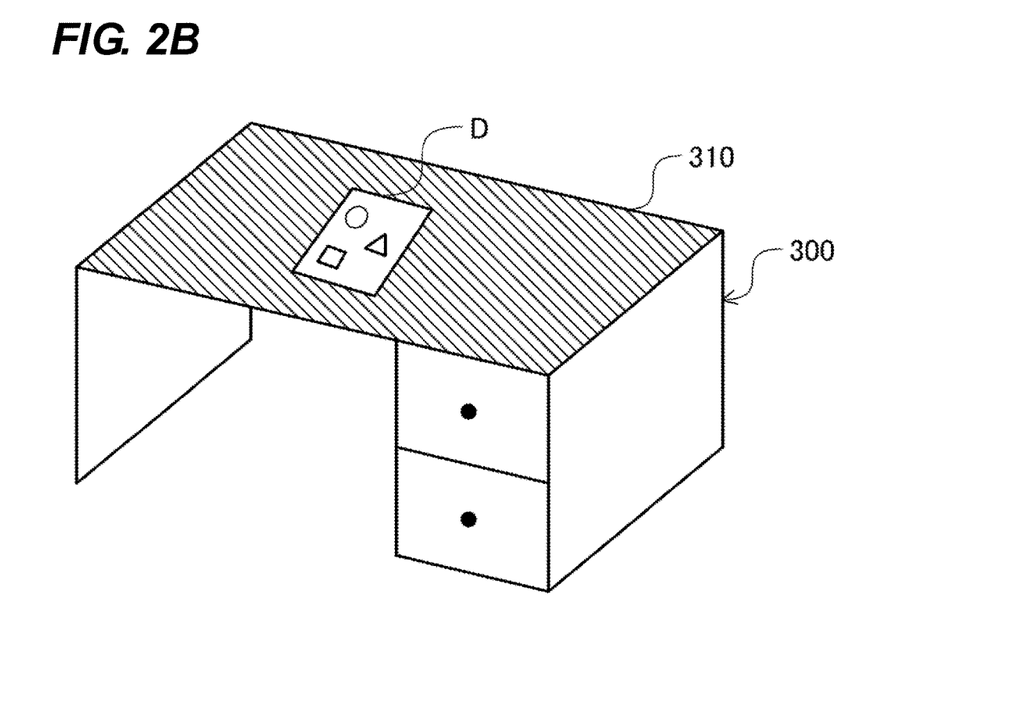

FIGS. 2A to 2B illustrate an environment where a document D as an image reading object for the image reading system 10 according to the one embodiment is placed. FIG. 2A illustrates a desk 300 without the document D. FIG. 2B illustrates the desk 300 with the document D. The document D is place on a top panel 310 of the desk 300. The top panel 310 has a predetermined texture of a gray color and serves as a platen.

Figure 3:
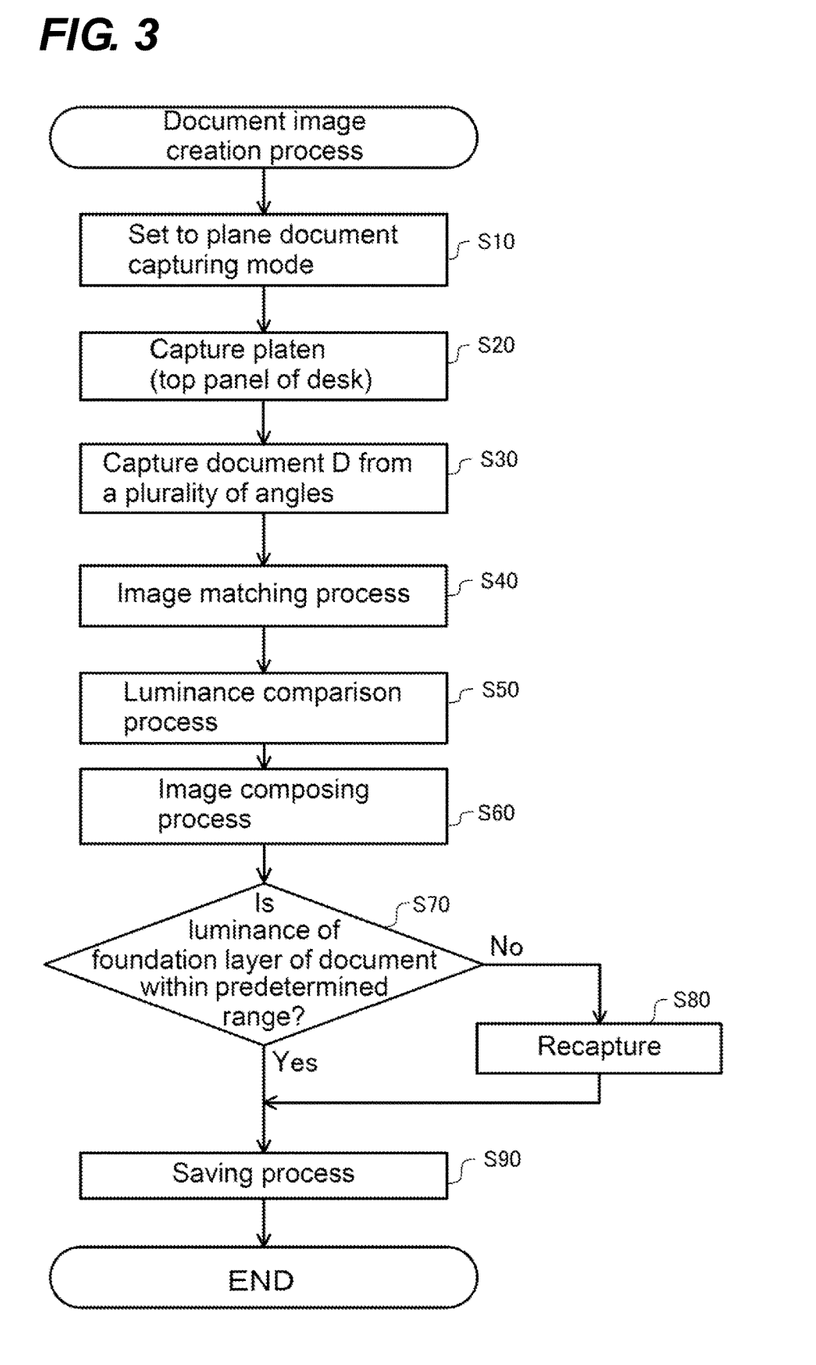
FIG. 3 illustrates contents of a document image creation process according to the one embodiment.

FIG. 3 illustrates contents of a document image creation process according to the one embodiment. At Step S10, a user operates the operation display 230 to set an operation mode of the smart phone 200 to a plane document capturing mode. The plane document capturing mode is a capturing mode supported by the document image obtaining application program 141. This capturing mode is an operation mode configured for obtaining an image of a plane document.

At Step S20, the user captures the top panel 310 of the desk 300. Capturing the top panel 310 is performed by setting the capturing mode to the platen and using the smart phone 200. The smart phone 200 can obtain an image (also referred to as a platen image) having the predetermined grey colored texture, which the top panel 310 has, as the image data. The smart phone 200 transmits the image data to the image forming apparatus 100 upon obtaining the image. The transmission of the image data is performed via the above-described short range wireless communication.

In this example, a texture image is used for clipping (extraction) of the image of the document D by removing a part of the top panel 310 from the captured image of the document D. However, without obtaining the texture image, the clipping process (the extraction process) may be performed as follows. The image of the document D has the following features compared with a peripheral area of the document D (a surface of the top panel 310):
(1) arranged in a center part (a central region) of the captured image;
(2) forming a contour with the peripheral area (a peripheral region outside the central region);
(3) having a remarkable density change; and
(4) having a feature part as a luminance gradient (detail will be described later).

Figure 4:
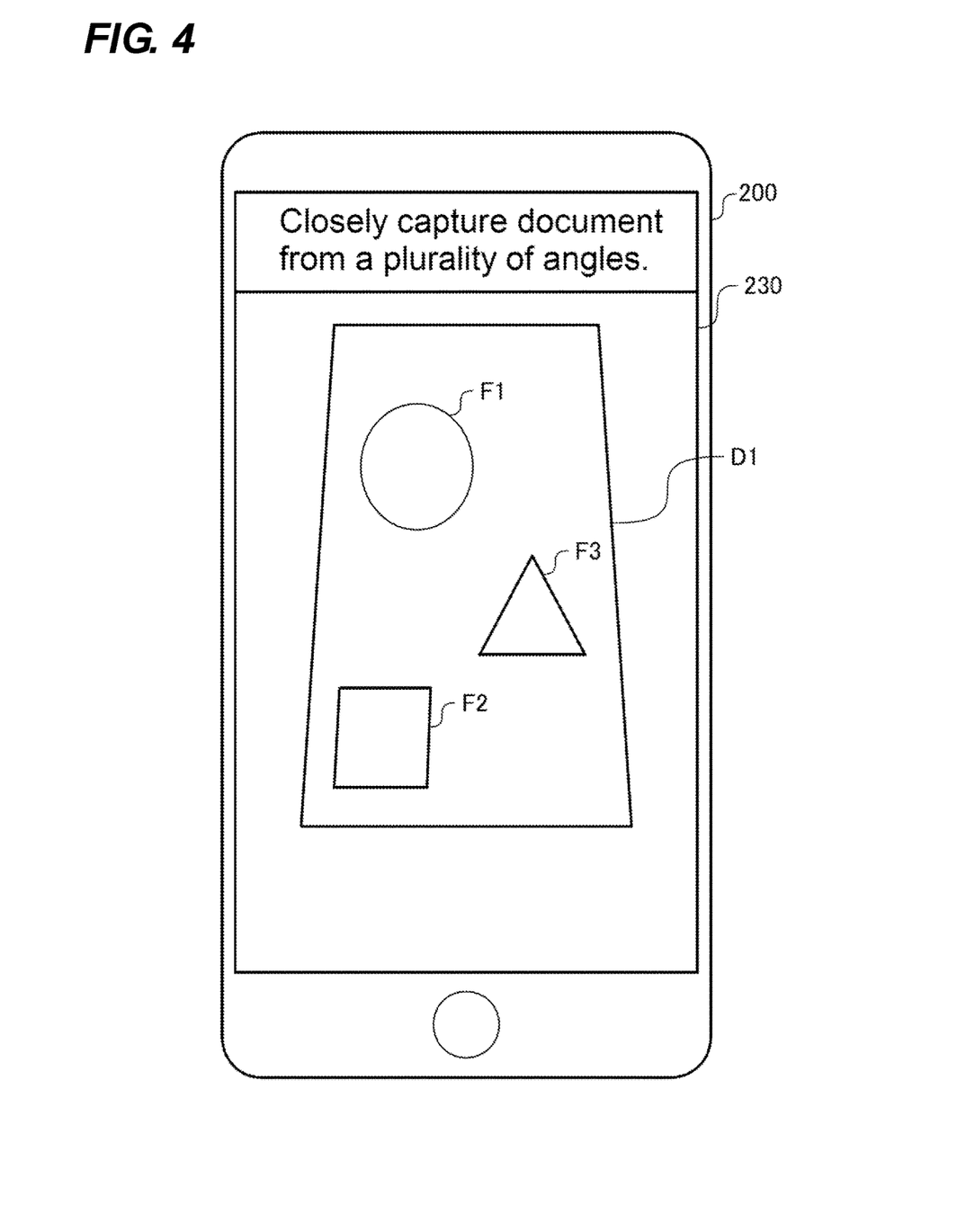
FIG. 4 illustrates a state of imaging by a smart phone according to the one embodiment.

FIG. 4 illustrates a state of imaging by the smart phone 200 according to the one embodiment. At Step S30, the user captures the document D placed on the top panel 310. Capturing the document D is performed for multiple times from a plurality of angles (mutually different angles) using the smart phone 200 with the capturing mode set to the document. Capturing from the plurality of angles is for changing positions of a shadow in other capturings even though the shadow is casted in the document D in a certain capturing (especially in a close-up capturing). This ensures obtaining each of image portions without the shadow in a wide range of regions of the document D.

The smart phone 200 transmits the image data to the image forming apparatus 100 each time the image is obtained. The transmission of the image data is performed via the above-described short range wireless communication.

The image forming apparatus 100 clips a document image, which is an image of the document D, among the image data. The document D shows a circular shape F1, a square shape F2, and a triangular shape F3 in this example. The circular shape F1, the square shape F2, and the triangular shape F3 form a feature part of the document image shown on the document D. The document image possibly includes a feature part formed by a text region, not only by the geometric shape.

At Step S40, the image analysis unit 122 included in the image forming unit 120 starts an image matching process in an image forming apparatus 100 side upon obtaining second image data. The image matching process can be performed, for example, by affine transformations. The image analysis unit 122 transforms a plurality of the image data into luminance data, which is data of luminance values representing brightness. The luminance value can be calculated from respective tone values of RGB using, for example, a predetermined calculating formula (luminance value 0.3R+ 0.6G+0.1B). The luminance data is associated with each of the image data.

This affine transformation is performed such that the document image becomes rectangular having a predetermined aspect ratio using, for example, an amount of features that is affine invariant (that is, the amount of features whose variation is restricted against the affine transformation (for example, a histogram in a luminance gradient direction)). Specifically, the affine transformation may be performed using an amount of Haar-like features focused on, for example, a circular shape of the circular shape F1 and corner portions of the square shape F2 and the triangular shape F3. Alternatively, a transform processing may be performed such that the whole document images mutually become similar using scaling (a scale transformation) and rotation using an amount of features of Scale-Invariant Feature Transform (SIFT) (for example, the histogram in the luminance gradient direction).

For example, Speeded-Up Robust Features (SURF), which is fast in process speed, may be used instead of the SIFT. The SIFT and the SURF are high in robustness against lighting change, thereby providing a remarkable effect in matching of the plurality of images having different states of the shadow.

Each of the document images is transformed into a rectangular image by the image analysis unit 122. The aspect ratio of the rectangular shape may be set (for example, A4 and B3) in advance, or the user may be asked for a size on the operation display 230 when the image data is generated. This makes the plurality of image data to become a plurality of image data transformed such that the shapes and the sizes correspond mutually in a planar shape of a preliminary set size (for example, A4).

At Step S50, the image analysis unit 122 executes a luminance comparison process. In the luminance comparison process the image analysis unit 122 divides each of a plurality of the luminance data into a plurality of regions. Each of the regions can be constituted as, for example, a pixel or a pixel block constituted of a plurality of pixels. The pixel block has a pixel block value that is an average value of the luminance value of the plurality of pixels constituting the pixel block. The image analysis unit 122 selects the image data associated with the luminance data having the highest luminance value by comparing the luminance values of each region.

At Step S60, the image combination unit 123 generates composite image data by using the image data selected as the highest luminance values of each region and composing each of the regions. The image data with a low luminance value is considered that, for example, a shadow of the smart phone 200 or a photographer is casted in the image data when the document D is imaged.

At Step S70, the image combination unit 123 determines whether a luminance of a foundation layer of the composite image data falls within a preliminary set range or not. Specifically, the image combination unit 123 detects a region of the foundation layer from the composite image data and determines whether the luminance of the foundation layer region falls within the preliminary set range or not. The detection of the foundation layer region is detected, for example, as a region with the pixel having the highest luminance among the pixel blocks for foundation layer detection that are preliminary set. The pixel block for the foundation layer detection is a block used for detecting the foundation layer and has a larger region than the above-described region.

When the luminance of the foundation layer region of the document D does not fall within the preliminary set range, that is, when a shadow region is detected (a shadow detected state), the process proceeds to Step S80. The shadow region is a region whose luminance of the foundation layer region is even lower than a luminance that is lower than the highest luminance LM in the image of the document D by a preliminary set threshold value Th. On the other hand, when the luminance of the foundation layer of the document D falls within the preliminary set range, that is, when the shadow region is not detected (a shadow non-detected state), the process proceeds to Step S90.

Figure 5:
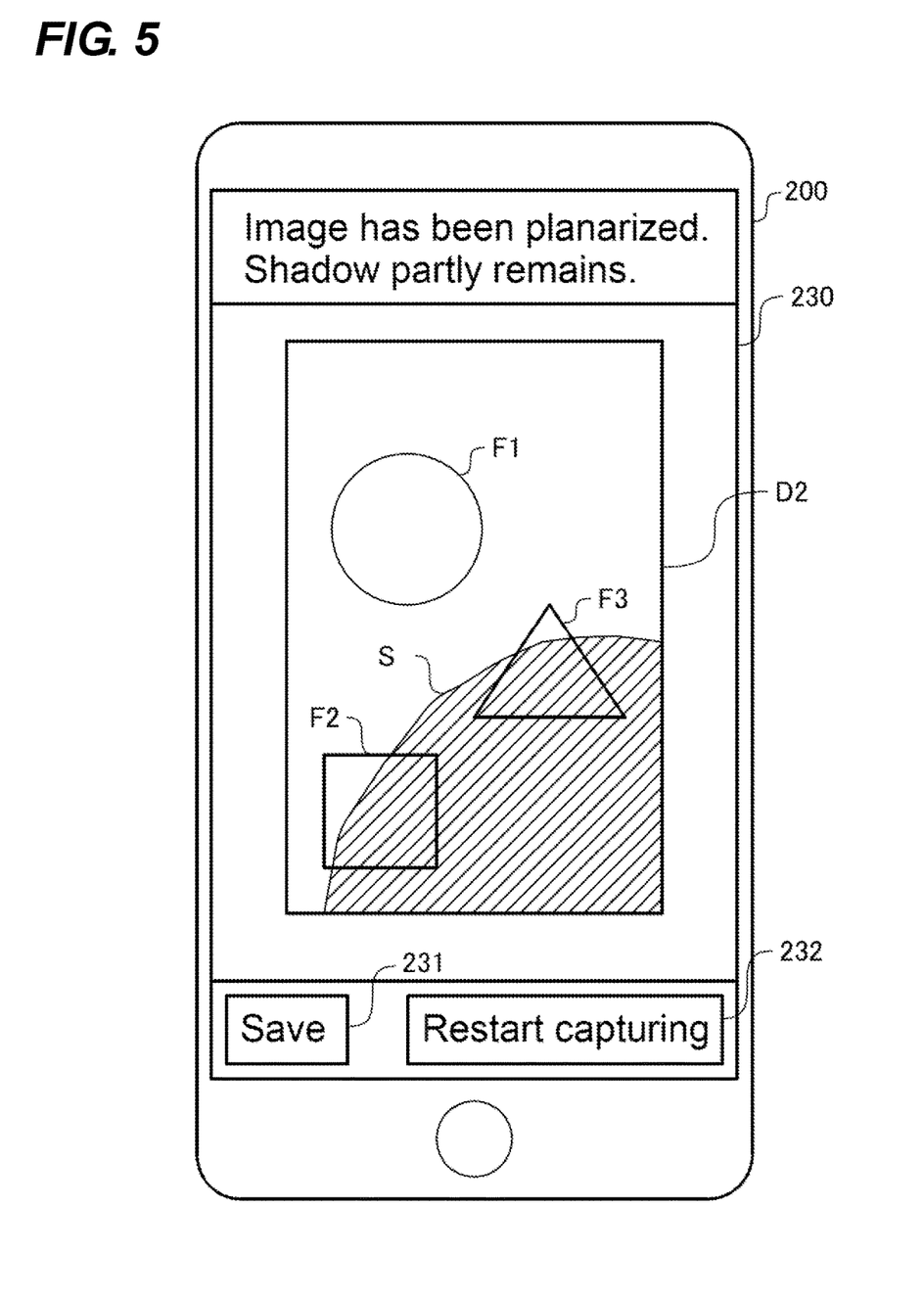
FIG. 5 illustrates a state where an image (a shadow detected state) generated by the smart phone according to the one embodiment is displayed.

FIG. 5 illustrates a state where an image (the shadow detected state) generated by the smart phone 200 according to the one embodiment is displayed. In this example, the smart phone 200 displays the composite image with a message saying "Image has been planarized. Shadow partly remains." in the operation display 230. A shadow S is casted in the composite image.

At Step S80, the user executes recapturing after determining that a displayed shadow is generated based on the displayed composite image. The user confirms a region where the shadow is casted to execute recapturing from a direction where the shadow is not casted in the identical region. Recapturing can be performed by touching a recapturing icon 232 for executing recapturing.

Figure 6:
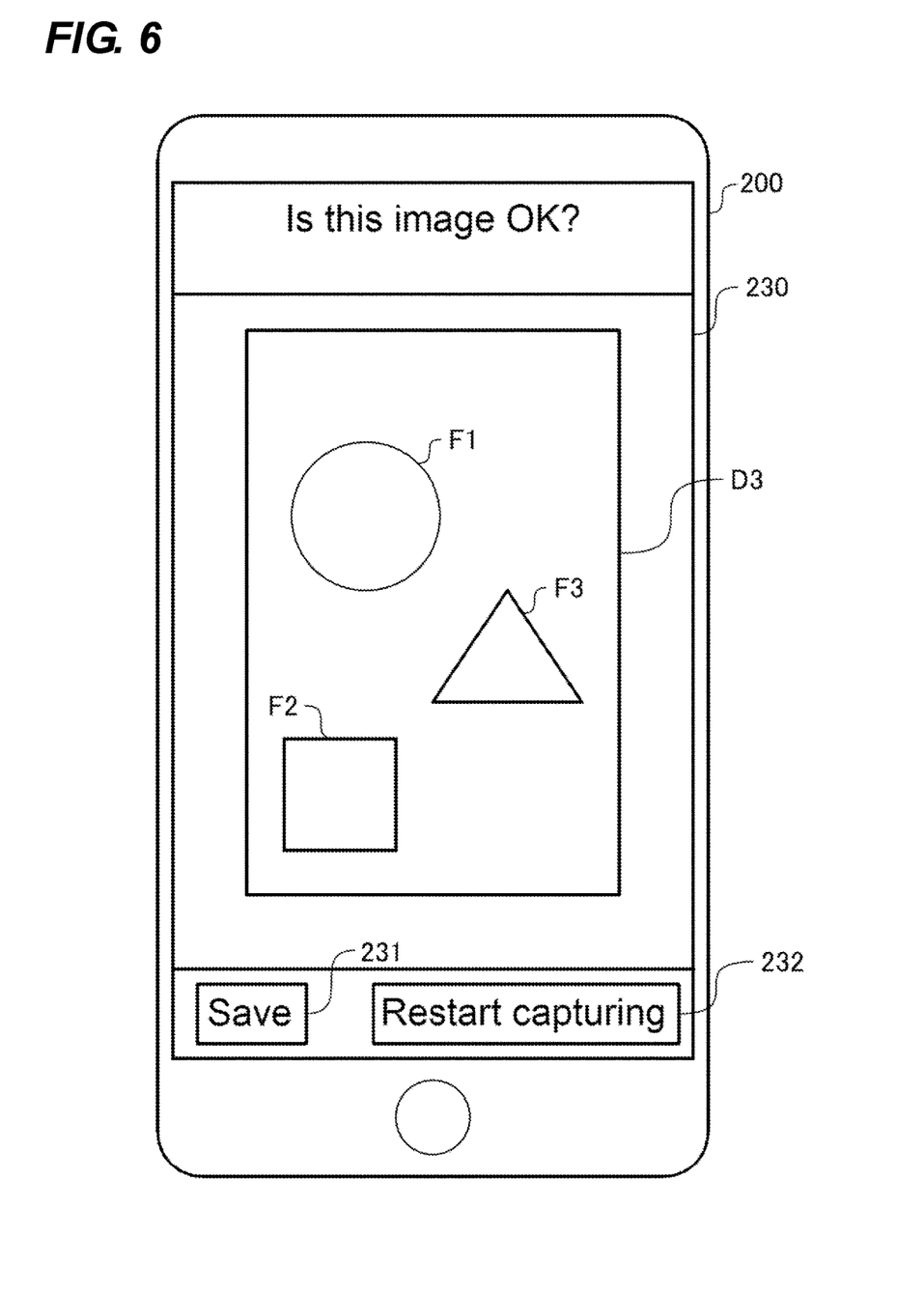
FIG. 6 illustrates a state where the image (a shadow non-detected state) generated by the smart phone according to the one embodiment is displayed.

FIG. 6 illustrates a state where the image (the shadow non-detected state) generated by the smart phone 200 according to the one embodiment is displayed. In this example, the smart phone 200 displays the composite image with a message saying "Is this image OK?" in the operation display 230.

At Step S90, the user saves the composite image after determining that the displayed shadow is not casted based on the displayed composite image. Saving can be performed by touching a saving icon 231.

Thus, according to this embodiment, without preparing a stable light source for capturing, a high-quality composite image can be easily generated by reading an image of a document using the smart phone 200. The composite image is a high-quality image with a high robustness against instability of the light source and a generation of the shadow.

While the composite image has the robustness against the instability of the light source and the generation of the shadow, it is difficult to widen a dynamic range of a contrast of the image. Accordingly, the composite image generates a histogram of the luminance of the composite image data. The composite image uses the luminance histogram to execute a level correction and widen the dynamic range of the contrast. Widening the dynamic range of the contrast widens between a highlighted portion and a shadow portion to make a room for enhancing a quality of the image (histogram stretching).

The disclosure can be executed not only in the above-described embodiment but also in the following modification.

Modification 1: While in the above-described embodiment, the disclosure is embodied as the image reading system 10 including the smart phone 200 and the image forming apparatus 100, the image forming apparatus 100 is not necessarily required. Specifically, for example, the smart phone includes the image analysis unit and the image combination unit and is configured to complete image reading by itself.

Modification 2: While in the above-described embodiment, the image combination unit uses the image data selected as having the highest luminance value and generates the composite image data by composing each region, an occurrence of halation is considered when, for example, a regular reflection light is received due to a positional relationship between the light source and the smart phone. In such a case, it may be configured such that the image data of the image data with the halation (or the regularly reflected region) is not selected.

Modification 3: While in the above-described embodiment, the luminance is used as an index to represent brightness, lightness may be used instead of the luminance.

Modification 4: While in the above-described embodiment, the luminance values are compared for each region and comparatively bright regions are used, the region may be set such that a text is not arranged between the regions with different image data. This ensures reducing situations in which unnatural discontinuous points are generated in a contour of the text.

Modification 5: While in the above-described embodiment, the smart phone is used, the disclosure is applicable to a portable terminal, such as a laptop PC and a tablet, as long as the portable terminal can capture. It is only necessary that the imaging unit is configured as the portable terminal or similar terminal that can generate the plurality of image data by imaging the document image for multiple times from mutually different angles.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus for reading a document image represented on a document set on a planar background surface, the image reading apparatus comprising:
   storage storing a document-image-obtaining application program;
   an imaging unit configured by the document-image-obtaining application program to generate from the document image a plurality of data images of varying shadow location, by imaging the document image multiple times from mutually differing angles;
   an image forming unit having processing circuitry configured by the document-image-obtaining application program to function as an image data analysis unit for performing a matching process on the plurality of data images by matching the plurality of data images, on a per-region basis in each of the plurality of images of the document represented by the plurality of data images of varying shadow location to obtain per-region brightnesses for the plurality of data images, and for each matching region comparing the obtained brightnesses to select from among the plurality of data images each data image whose per-region brightness is comparatively brighter and is within a predetermined range defining a shadowless state; and an image compositing unit for using the data images selected on the per-region basis as comparatively brighter and within the predetermined range defining the shadowless state, to generate a composite data image, and for prompting the imaging unit to reimage the document image when for any matching region, none among the plurality of data images has a brightness that is within the predetermined range defining the shadowless state.

2. The image reading apparatus according to claim 1, wherein the image data analysis unit extracts as the document image, from among the images represented by the plurality of data images, an image in a region having a contour with a peripheral area outside a central region located in a center portion of the image.

3. The image reading apparatus according to claim 1, wherein the image data analysis unit obtains from the planar background surface a platen image as an image of a platen before the document is arranged and extracts the document image by removing a region similar to the platen image.

4. The image reading apparatus according to claim 1, wherein the image compositing unit generates a histogram of the composite data image and executes a level correction using the histogram.

5. The image reading apparatus according to claim 1, wherein the image data analysis unit extracts a feature point from respective images represented by the plurality of data images, and performs matching on the plurality of data images by deforming the plurality of data images such that the extracted feature points correspond.

6. An image forming apparatus comprising:
the image reading apparatus according to claim 1; and
an image forming unit that forms an image of the composite data image generated by the image reading apparatus on a print medium.

7. An image reading method for reading a document image represented on a document set on a planar background surface, the image reading method comprising:

generating from the document image a plurality of data images of varying shadow location, by imaging the document image multiple times from mutually differing angles;

performing a matching process on the plurality of data images by matching the plurality of data images, on a per-region basis in each of the plurality of images of the document represented by the plurality of data images of varying shadow location to obtain per-region brightnesses for the plurality of data images, and for each matching region comparing the obtained brightnesses to select from among the plurality of data images each data image whose per-region brightness is comparatively brighter and is within a predetermined range defining a shadowless state; and using the data images selected on the per-region basis as comparatively brighter and within the predetermined range defining the shadowless state, to generate a composite data image, and reimaging the document image when for any matching region, none among the plurality of data images has a brightness that is within the predetermined range defining the shadowless state.

8. A non-transitory computer-readable recording medium that stores an image reading program for controlling an image reading apparatus for reading a document image represented on a document set on a planar background surface, the image reading program causing the image reading apparatus to function as:

an imaging unit for generating from the document image a plurality of data images of varying shadow location, by imaging the document image multiple times from mutually differing angles;

an image data analysis unit for performing a matching process on the plurality of data images by matching the plurality of data images, on a per-region basis in each of the plurality of images of the document represented by the plurality of data images of varying shadow location to obtain per-region brightnesses for the plurality of data images, and for each matching region comparing the obtained brightnesses to select from among the plurality of data images each data image whose per-region brightness is comparatively brighter and is within a predetermined range defining a shadowless state; and an image compositing unit for using the data images selected on the per-region basis as comparatively brighter and within the predetermined range defining the shadowless state, to generate a composite data image, and for prompting the imaging unit to reimage the document image when for any matching region, none among the plurality of data images has a brightness that is within the predetermined range defining the shadowless state.

* * * * *